(12) United States Patent
Grossi

(10) Patent No.: US 9,115,413 B2
(45) Date of Patent: Aug. 25, 2015

(54) APPARATUS AND METHODS FOR PRODUCING DIRECT REDUCED IRON

(76) Inventor: Giulio Grossi, Lively (CA)

(*) Notice: Subject to any disclaimer, the term of this patent is extended or adjusted under 35 U.S.C. 154(b) by 98 days.

(21) Appl. No.: 13/582,180

(22) PCT Filed: Mar. 2, 2011

(86) PCT No.: PCT/CA2011/000235
§ 371 (c)(1),
(2), (4) Date: Aug. 31, 2012

(87) PCT Pub. No.: WO2011/106883
PCT Pub. Date: Sep. 9, 2011

(65) Prior Publication Data
US 2012/0325053 A1    Dec. 27, 2012

Related U.S. Application Data

(60) Provisional application No. 61/309,664, filed on Mar. 2, 2010.

(51) Int. Cl.
*C21B 13/14* (2006.01)
*C21B 13/10* (2006.01)
*C21B 13/06* (2006.01)
*F27B 9/02* (2006.01)
*F27B 9/18* (2006.01)

(52) U.S. Cl.
CPC ............... *C21B 13/06* (2013.01); *C21B 13/105* (2013.01); *F27B 9/185* (2013.01); *C21B 13/143* (2013.01)

(58) Field of Classification Search
CPC ...... C21B 13/06; C21B 13/08; C21B 13/105; C21B 13/146; F27B 9/185

USPC ............... 75/484; 266/173, 176, 145, 156
See application file for complete search history.

(56) References Cited

U.S. PATENT DOCUMENTS

| | | | |
|---|---|---|---|
| 3,770,417 A * | 11/1973 | Kranz | 75/484 |
| 6,395,057 B1 | 5/2002 | Frieden et al. | |
| 6,447,713 B1 | 9/2002 | Monteyne | |

(Continued)

FOREIGN PATENT DOCUMENTS

| CA | 2351969 A1 * | 12/2001 |
|---|---|---|
| CA | 2443043 A1 | 10/2002 |
| CA | 2448361 A1 | 1/2003 |
| CA | 2512654 A1 | 7/2004 |

(Continued)

OTHER PUBLICATIONS

International Search Report PCT/CA2011/000235 dated May 9, 2011.

*Primary Examiner* — George Wyszomierski
*Assistant Examiner* — Tima M McGuthry Banks
(74) *Attorney, Agent, or Firm* — Roberts Mlotkowski Safran & Cole P.C.

(57) ABSTRACT

A hearth furnace for producing direct reduced iron is described. The furnace has first and second combustion chambers, each having a rotating hearth within it to receive iron oxide and reducing agent. A set of rabbles disposed over each of the rotating hearths interacts with the iron oxide and pushes the iron oxide towards an inside or an outside edge of each rotating hearth. The first combustion chamber having an outlet connected to an inlet of the second combustion chamber to receive materials pushed by the rabbles of the first combustion chamber to the first combustion chamber outlet. The furnace further comprising one or more gas transfer channels for transferring reduction gasses and heat between the second and first combustion chambers.

13 Claims, 12 Drawing Sheets

(56) References Cited

U.S. PATENT DOCUMENTS 6,488,737 B1 12/2002 Monteyne
2003/0047038 A1 3/2003 Iwasaki et al.

FOREIGN PATENT DOCUMENTS

CA 2664825 A1 4/2008
GB 109381 A * 9/1917

* cited by examiner

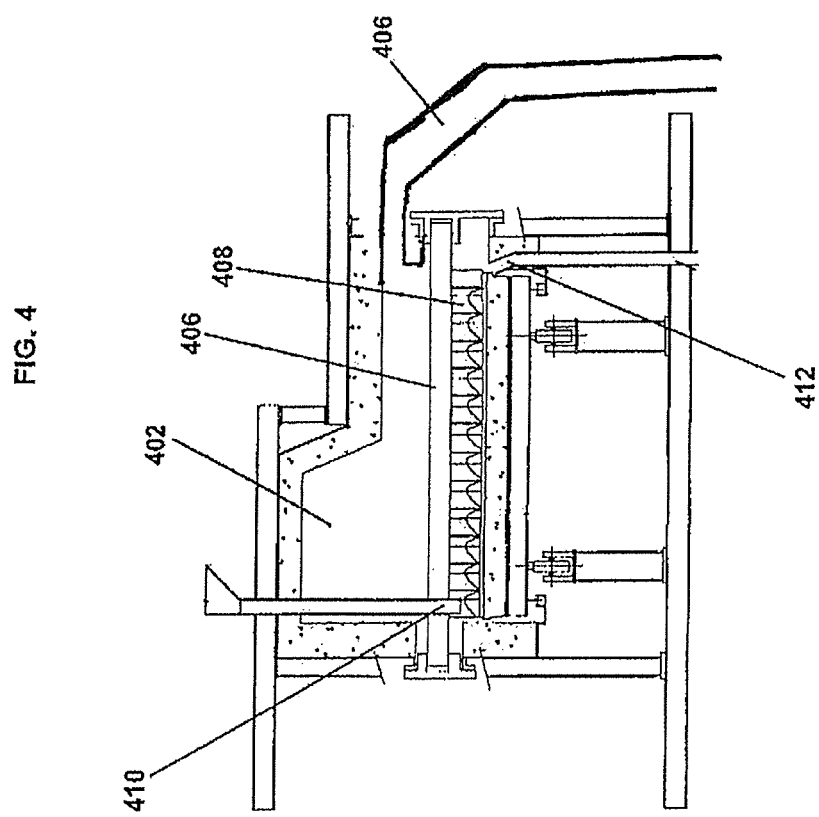

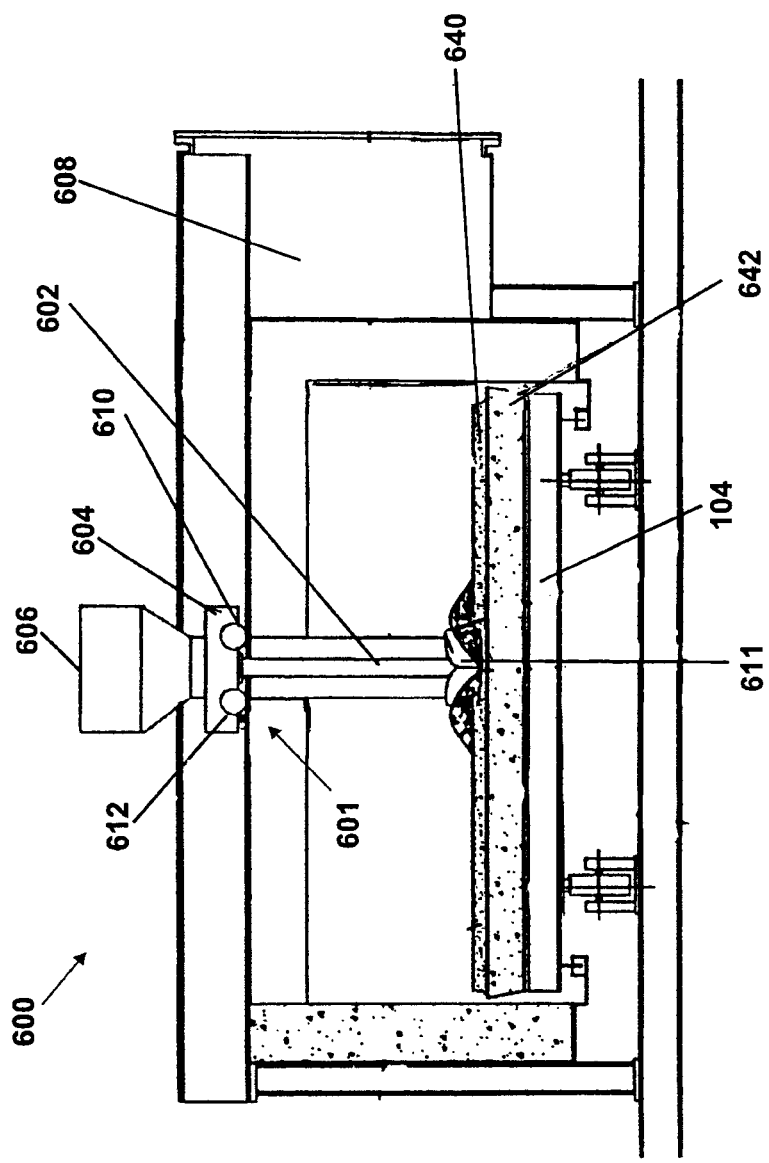

APPARATUS AND METHODS FOR PRODUCING DIRECT REDUCED IRON

RELATED APPLICATIONS

This application claims the benefit of U.S. Provisional Application No. 61/309,664 filed on Mar. 2, 2010, the contents of which are herein incorporated by reference.

A portion of the disclosure of this patent document contains material which is subject to copyright protection. The copyright owner has no objection to the reproduction by anyone of the patent document or the patent disclosure, as it appears in the files or records of patent office(s), but otherwise reserves all copyrights whatsoever.

FIELD OF THE INVENTION

This invention relates to the field of iron purification, and more specifically relates to production of direct reduced iron.

BACKGROUND

Many common metallurgical processes, such as iron and steel making, produce natural by-products and waste materials in the form of dust and sludge. These by-products often contain oxides of iron, zinc, lead and cadmium. In some cases, like the by-products from a blast furnace, this waste material may also contain carbon, oil and grease. Due to its high monetary value, it is often desirable to reclaim the iron in this material for reuse; however, the presence of zinc and lead oxides or, in some instances, the presence of oil and/or grease, in the waste material make attempts to purify the iron difficult and impractical.

One method of reclaiming iron from iron oxide wastes is by reducing iron oxides through the use of high temperatures. Traditionally iron has been extracted from iron oxides, by means of indirect reduction, whereby blast furnaces transform iron ore into iron, in a molten state. Such processes produce iron high in carbon content, often called pig iron.

In another method direct reduced iron (DRI) can be produced by the solid state reduction of charged iron oxides into metallic iron without the formation of liquid iron.

In both processes, a reducing agent, generally solid or gaseous in form, is used to heat the ore to the high temperatures required for the reduction reaction. Examples of reducing agents are coal and natural gas. The reduction of the iron ore takes place through the interaction with hydrogen or carbon monoxide. For example, where the reducing agent is coal, the coal burns in a combustion furnace with carbon dioxide in the air to form carbon monoxide ($C+CO_2=2CO$ Boudouard reaction). This carbon monoxide then reacts with the iron ores, in the presence of heat, to produce iron and carbon dioxide ($Fe_2O_3+3CO=2Fe+3CO_2$).

DRI tends to be advantageous over other types of iron, such as steel making waste and pig iron, because it has a known composition, has fewer impurities and can be continuously charged in steel making furnaces. Also, DRI processes require temperatures of less than 1000 degrees Celsius, as compared to indirectly reduced iron, produced in blast furnaces, which can require liquid iron temperatures of 1450 degrees Celsius.

The reduction process, which requires mixing of the reducing agent and the iron oxide at high temperatures, can be carried out in hearth furnaces. Rotary hearth furnace technology has been described, for example, in U.S. Pat. No. 5,186,741 or 4,701,214.

With most current DRI production, the input material is prepared before it is charged into the rotary hearth furnace. That material preparation consists of mixing, pelletizing or briquetting and mostly drying. During about one revolution of the hearth, the pellets or briquettes react and are discharged from the rotating hearth furnace.

Due to the low thermal conductivity in the material used in these systems, the rotary hearth furnace temperature is considerably higher than the temperature required for the reaction in order to ensure that all the material in the pellet or briquette reaches the temperature required for the metallurgical reactions. In these systems, the temperature in the rotary hearth furnace casing is controlled by burners installed in the roof or the side walls of the rotary hearth furnace and is normally between 1200 and 1400 degrees Celsius.

Multiple hearth processes for DRI production have also been described, for example, in U.S. Pat. No. 6,395,057 which describes a cylindrical furnace lined with refractory material with several fixed hearths made of refractory material. It has a rotating shaft in the centre of the multiple hearth furnace and that shaft supports rotating arms with rabbles. These rabbles transport the material across the different hearths, and the material that is charged on the upper hearth drops from one hearth to the next until it exits the multiple hearth furnace from the bottom hearth. However, in this system, because the hearth remains stationary and the rabbles and arms rotate, there is a gap between the hearth and the walls and the rabbles which is required to avoid mechanical interference. This gap tends to fill up with material during the process, forming a dead layer of input material that cannot be processed of moved. Over time that material can also harden to create an interference with the rotating rabbles.

It tends to be desirable to provide apparatus, process, systems and methods to overcome problems existing in the production of DRI. For example, it tends to be desirable to provide apparatus, process, systems and/or methods for treating metal oxide fines to recover elemental iron from iron-bearing materials including, for example, iron-bearing ores, steel mill waste and other metallurgical process waste. Additionally, it may be advantageous to provide apparatus, process, systems and methods which provide improved heat transfer and reduces material preparation, for example, agglomeration of the material feed into pellets and briquettes. Further, it may be advantageous to provide apparatus, process, systems and methods whereby accretions of material feed can be avoided, and where accretions cannot be avoided, the hardened material between system parts can be removed easily. It may additionally be desirable to provide apparatus, systems and methods of producing DRI whereby energy efficiency may be increased by using heat from the chemical energy of process gases and volatile matter, to reach the temperatures required for the reduction process.

SUMMARY OF INVENTION

In an aspect of the present invention there is provided a hearth furnace for producing direct reduced iron, the hearth furnace comprising: a first combustion chamber; a first rotating hearth within the first chamber configured to receive onto its surface iron oxide materials from a first chamber inlet disposed over the first rotating hearth; and a first set of rabbles disposed over the first rotating hearth to interact with the iron oxide materials, the first set of rabbles configured to push the iron oxide materials on the surface of the first rotating hearth towards a first chamber outlet located towards one of an inside edge of the first rotating hearth or an outside edge of the first rotating hearth as the hearth and the first set of rabbles move relative to one another, the first set of rabbles being configured to interact with the iron oxide materials over the entirety of the surface of the rotating hearth between the inside and outside edge of the first rotating hearth; a second combustion chamber; a second rotating hearth within the second chamber, the second chamber having a second chamber inlet connected to the first chamber outlet of the first combustion chamber and configured to receive materials pushed to the first chamber outlet and direct the materials onto the second rotating hearth of the second combustion chamber; a second set of rabbles disposed over the second rotating hearth of the second combustion chamber, the second set of rabbles configured to push the materials received from the first combustion chamber onto the surface of the second rotating hearth towards a second chamber outlet of the second combustion chamber located towards one of an inside edge or an outside edge of the second rotating hearth of the second combustion chamber as the second hearth and the second set of rabbles moves relative to one another, the second set of rabbles being configured to interact with the received materials over the entirety of the surface of the second rotating hearth of the second combustion chamber between its inside and outside edges; and one or more gas transfer channels connecting the first and second combustion chambers, the gas transfer channel being wider than the chamber inlet of the second combustion chamber and configured to transfer reduction gases and heat from a reduction reaction of the received material in the second combustion chamber to the first combustion chamber.

In some embodiment, the interior volume of the first combustion chamber may be larger than the interior volume of the second combustion chamber. In other embodiments, the first chamber inlet may be proximate to the inside edge of the first rotating hearth, the first chamber outlet may be proximate to the outside edge of the first rotating hearth, the second chamber inlet may be proximate to the outside edge of the second rotating hearth, and the second chamber outlet may be proximate to the inside edge of the second rotating hearth.

In some embodiments, the one or more gas transfer channels may be disposed proximate to the outside edges of the first and second rotating hearths. In other embodiments, the interior height of the first combustion chamber may be taller proximate to the first chamber inlet than proximate to the first chamber outlet.

In some embodiments, the first and second combustion chambers may have multiple burners for controlling the temperature inside each combustion chamber. In other embodiments, the first combustion chamber may be maintained at a different temperature than the second combustion chamber.

In some embodiments, the first rotating hearth further may receive onto its surface a reducing agent, and the first set of rabbles may be configured to mix the reducing agent with the iron oxide materials as the first rotating hearth and first set of rabbles move relative to one another.

In some embodiments, the rotating hearth of the second combustion chamber may receive onto its surface a further reducing agent, and the second set of rabbles may be configured to mix the further reducing agent with the materials received from the first combustion chamber as the second rotating hearth and the second set of rabbles move relative to one another.

In some embodiments, the first set of rabbles may be attached to one or more stationary arms over the first rotating hearth, and the rotation of the first hearth may cause the first rotating hearth and rabbles to move relative to one another. In other embodiments, the rabbles of the second combustion chamber may be attached to one or more stationary arms over the rotating hearth of the second combustion chamber, and the rotation of the rotating hearth of the second combustion chamber may cause the hearth and rabbles of such chamber to move relative to one another. In some embodiments, the stationary arms of the first and second combustion chambers may each have a cooling fluid circulating therethrough.

In other embodiments, the hearth furnace may further comprise a solid projection extendible toward the surface of at least one of the first and second rotating hearths, the solid projection may be adjustable for placement of the projection tip onto a layer of material formed on the surface between the inside edge and the outside edge of at least one of the first and second rotating hearths and may break the layer of material and expose a groove as the rotating hearth rotates; and may further comprise a discharge chute that may be configured to deposit an inert material onto the exposed groove.

In some embodiments, the hearth furnace may further comprise a hopper that may receive the inert material, and the hopper may be connected to the discharge chute which may deliver the inert material to the discharge chute. In other embodiments, the delivery of inert material from the hopper to the discharged chute may be controlled by a valve. In some embodiments, the solid projection may have a cooling fluid circulating therethrough and may be selected from one of a pin, plough or shovel. In other embodiments, the hearth furnace may further comprise a garage area that may receive the solid projection when the solid projection is not in use.

In a further aspect of the present invention, there is provided a process for producing direct reduced iron. The process comprises: charging iron oxide materials onto a first rotating hearth in a first combustion chamber; moving the iron oxide materials by rotating the first rotating hearth, the iron oxide materials interacting with a first set of rabbles disposed over the first rotating hearth to direct the iron oxide materials towards a first chamber outlet and dropping through the first chamber outlet; receiving the dropped iron oxide materials from the first chamber outlet onto a second rotating hearth in a second combustion chamber through a chamber inlet of the second chamber; moving the iron oxide materials by rotating the second rotating hearth, the iron oxide materials interacting with a second set of rabbles disposed over the second rotating hearth to direct the iron oxide materials towards a second chamber outlet; and transferring reduction gases and heat from a reduction reaction in the second combustion chamber to the first combustion chamber through one or more gas transfer channels connecting the first and second combustion chambers, the gas transfer channels being wider than the chamber inlet of the second chamber, whereby the reduction gases and heat assist a reduction reaction in the first combustion chamber, and the reduction reactions in the first and second combustion chamber produce direct reduced iron from the iron oxide materials.

In another aspect of the present invention, a hearth furnace is provided, the hearth furnace comprising: a combustion chamber; a rotating hearth within the chamber for receiving onto its surface iron oxide materials from a chamber inlet disposed over the rotating hearth, the rotating hearth surface having and being disposed within an inside edge and an outside edge; a solid projection extendible toward the surface of the rotating hearth and adjustable for placement of the projection tip onto a layer of material formed on the surface between the inside edge and outside edge to break the layer of material and expose a groove as the rotating hearth rotates; and a discharge chute configured to deposit an inert material onto the exposed groove.

In some embodiments, the solid projection may have a cooling fluid circulating therethrough and may be selected from one of a pin, plough or shovel.

In a further aspect of the present invention a method for applying an inert material to a surface of a rotary hearth furnace is provided, the method comprising: breaking a layer of material formed on the surface of the hearth furnace as the hearth furnace rotates with a cleaning device comprised of a solid projection extendible toward the surface of a rotating hearth within a chamber of the rotary hearth furnace; moving the broken materials to expose a groove in the materials; delivering the inert material to the exposed groove; and adjusting the position of the solid projection between an inside edge and an outside edge of the surface.

BRIEF DESCRIPTION OF THE DRAWINGS

For a better understanding of embodiments of the apparatus, process, systems and methods described herein, and to show more clearly how they may be parried into effect, reference will be made, by way of example, to the accompanying drawings in which:

FIG. 4 shows a cross sectional view of an alternate combustion chamber that may be used with the furnace of FIG. 3A;

FIG. 6A shows a front view of an embodiment of a cleaning apparatus for use in a rotating hearth combustion chamber of a furnace;

DETAILED DESCRIPTION

Figure 1A:
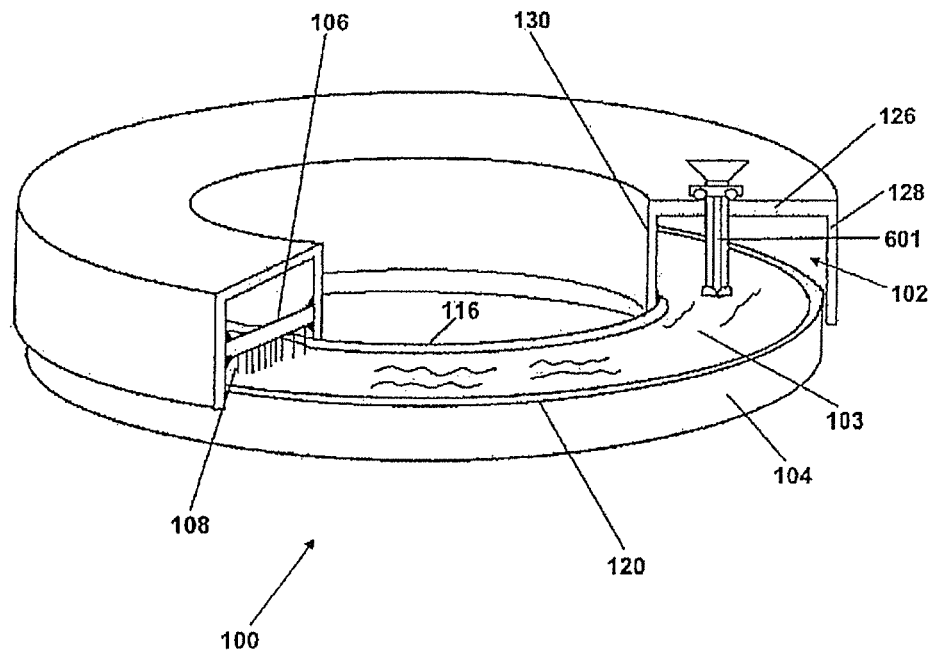
FIG. 1A is a perspective view of an embodiment of a combustion chamber and furnace for producing direct reduced iron, with a section cut-out to show interior components of the chamber.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1B:
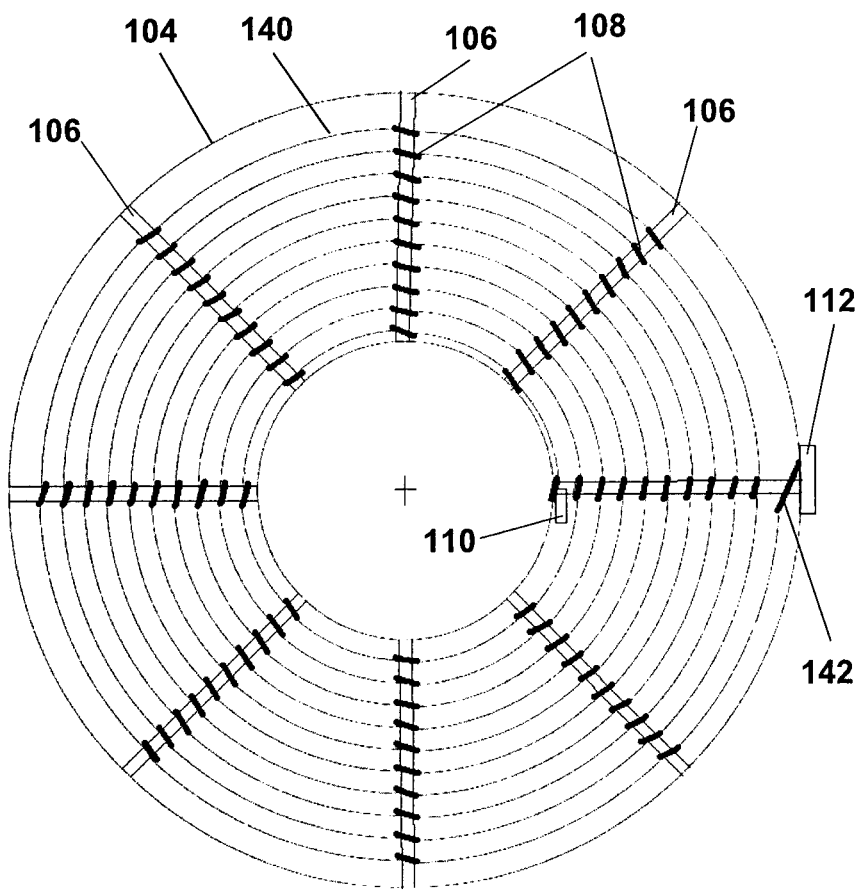
FIG. 1B is a top down view of a hearth and other components of a combustion chamber of FIG. 1A.
Figure 2:
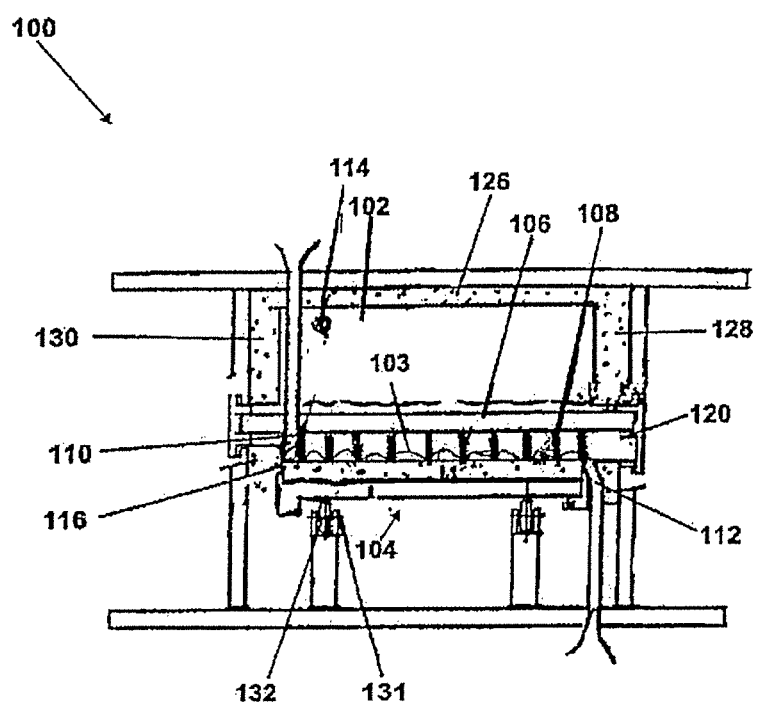
FIG. 2 is a cross sectional view of the combustion chamber of FIG. 1A.

With reference to FIG. 1A, FIG. 1B and FIG. 2, apparatus 100 is shown providing a combustion chamber 102 that may be useful in a system for producing direct reduced iron. In an embodiment, such a chamber 102 may be used, for example, in a multiple level furnace by providing connections between chambers layered over one another, as described in more detail with reference to FIG. 3 below. As shown in FIG. 1A and FIG. 2, apparatus 100 includes a combustion chamber 102, burners 114, chamber inlet(s) or material entry point(s) 110, and chamber outlet(s) or material exit point(s) 112. Iron oxide compounds and reducing agents enter through material entry points 110 and interact with one another in a reduction reaction, before exiting the chamber through material exit points 112, as direct reduced iron and gas by-products. In some embodiments, the inside of chamber 102 may be lined with a refractory material, and/or the chamber walls may include an insulation material. The materials placed onto hearth 104 are shown as input materials 103 in the figures, and they can include the iron oxide compounds, reducing agents, additives, including such materials pre, during or post reduction reaction.

One or more material entry points are provided to combustion chamber 102, to add reducing material or other additives to various stages of the process. In an embodiment, chamber inlet 110 may be used to charge the reducing material or other additives also.

In the embodiment in FIG. 1A and FIG. 2, combustion chamber 102 provides an interior volume whereby reducing agents, for example coal and natural gas, react with air and heat from burners 114 to form carbon based reducing gases such as carbon monoxide. The reduction of iron oxide is accomplished through a reaction of input materials 103 with reducing gases such as carbon monoxide, hydrogen or solid carbon. Individuals skilled in the art, will, however, appreciate that other chemical processes can be used to reduce iron oxide to the form of reduced iron.

In the embodiment of FIG. 1A and FIG. 2, combustion chamber 102 also generates the heat required for the reduction reaction of iron oxide with the reducing gas. Burners 114 located inside combustion chamber 102 are used to create, control and maintain the elevated temperature requirements of the reduction reaction. Burners 114 may be fired with gaseous, liquid or solid combustibles, typically to generate temperatures of 800-1400 degrees Celsius; however, persons skilled in the art will recognize that temperature requirements vary according to environmental conditions, materials used and reactions desired. Although burners 114 and combustion chambers 102 are common means of attaining high reaction temperatures, skilled persons will also understand that in alternate embodiments, combustion chambers 102 can be heated by alternative means, such as electrical or chemical reactions.

Apparatus 100 also includes a rotating hearth 104, acting as a base for the combustion chamber 102. Additionally, apparatus 100 includes arms 106 disposed over the hearth 104. In the shown embodiment, arms 106 extend across the interior of chamber 102, and have rabbles 108 attached along the length of each arm 106, the rabbles 108 extending towards hearth 104. Although only one arm 106 is shown in FIG. 1A and FIG. 2, it will be appreciated that one or more arms 106 (and rabbles 108 attached thereto) may be used. The hearth 104 may, for example, have between 2 and 10 arms depending on the diameter of the combustion chamber 102. In other embodiments, an arm or other member may not be needed, and rabbles 108 may be suspended from supports internal to chamber 102.

The iron oxide material feed that may be used in the embodiment of FIG. 1A can typically be iron ore or residue from iron and steel making, and other metallurgical processes. Such materials may be pelletized or briquetted, or in an embodiment in the form of dust and sludge, or a combination of pellets, briquette, dust and/or sludge, and may contain oxides of iron, as well as oxides of impurities such as zinc, lead and cadmium. As shown in FIG. 1A and FIG. 2, the iron oxide material is charged onto one side of the hearth 104 through an inlet 110 to the chamber 102, while the reducing agent may be charged together with the iron oxide. The reducing agent may be mixed with the iron oxide materials, or it may not be so mixed in other embodiments. The reducing agent may also be charged into the chamber via a separate outlet in other embodiments.

In the embodiment shown in FIG. 1A and FIG. 2, at the underside of hearth 104, one or more wheels 132 on mounts/rails 131 are provided to support hearth 104 and enable rotation of hearth 104. The wheels, which by way of example, may number from 3 to more than 20, depending on the diameter of the hearth 104, may travel on annular fixed rails attached to the bottom side of hearth 104. The rotation of hearth 104 may be by drive means known to one of skill in the art, which may include an electric motor with a gear, or a hydraulic or pneumatic motor. A mechanism, such as a sealing system within combustion chamber 102, prevents gas from inside the chamber from escaping or air from outside from entering.

Combustion chamber 102, in the embodiment shown, is annular in shape such that a cross sectional view of the chamber is U-shaped. It will be understood by one skilled in the art, however, that alternative chamber shapes and dimensions can be used.

In the embodiment shown, hearth 104 rotates inside combustion chamber 102 that is comprised of annular casing with outer circumference wall 128, inner circumference wall 130 and annular roof 126. A refractory lining may be placed within the annular casing which can tend to improve overall efficiency of the combustion chamber. The composition of the material may consist of different layers. For example, the layer closest to the external environment may consist of an insulating material, such as fibre, light bricks or castable material; and the layer closest to the combustion chamber 102 may consist of a high temperature resistant material. Persons skilled in the art will appreciate that different materials and/or layers can be used to achieve a refractory lining with insulating and heat resistant properties.

In the embodiment shown in FIG. 1A-B and FIG. 2, rabbles 108 extend outwardly from arms 106, towards hearth 104. Input material 103, containing iron oxide, lies on hearth 104, and is mixed with the reducing agent by the stationary rabbles 108 as hearth 104 rotates. Rabbles 108 transport input material 103 from one end of the hearth 104 to another, for example, by pushing input material 103 in a spiral fashion as hearth 104 rotates to move materials 103 across the surface of hearth 104 from the input location proximate to chamber inlet 110 towards chamber outlet 112.

With reference to FIG. 1B, a top view of hearth 104 (and of arms 106 and rabbles 108) is shown. Apparatus 100 as shown has eight arms 106 spaced at angles of approximately 45 degrees from one another, although it will be understood by one skilled in the art, that the number of arms and spacing can be changed depending on desired frequency of contact between rabble 108 to input material 103 and desired speed of movement across the surface of hearth 104. In the embodiment, rabbles 108 are positioned at angles from one another, to move the material in a sideways direction along hearth 104. In this embodiment, rabbles 108 are spaced in increments, from one another, tending to increase contact with input material 103 and increase mixing with the reducing agent. Persons skilled in the art will appreciate that such spacing can be varied to accommodate factors such as input material particle size, desired mixing frequency and other spacing dependent requirements.

With reference to FIG. 1B, rabbles 108 are arranged to transfer material from inlet 110 to outlet 112. The material tends to flow through hearth 104 in a notional spiral motion shown as 140. The input material falls onto hearth 104 through inlet 110. For example, in operation iron ore material is charged into combustion chamber 102 via chamber inlet 110 and a reducing agent, such as coal, is added to combustion chamber 102, typically also via chamber inlet 110. Burners heat the iron ore materials and additionally heat the coal, to produce the reducing agent such as carbon monoxide to react with the iron ore material. Hearth 104 rotates so that iron ore materials can interact with the rabbles 108 mounted to arms 106, causing the iron ore material to travel along the surface of hearth 104, such as in a spiral direction and mixing with the reducing agent, and pushing the reacting/reacted iron ore material towards chamber outlet 112. Once the iron materials move from inlet 110 to the opposite side of the hearth 104, outlet guide 142 directs the material out of the chamber through outlet 112.

In an embodiment, rabbles 108 can be removed to facilitate cleaning and replacement. Rabbles 108 may also be cleaned during operation of the system, either manually or, in alternative embodiments, with automatic cleaning lances running high pressure gas or liquid along the arms, that can be fixed or retractable. Rabbles 108 can be adjustable in height which can tend to regulate the thickness of material resting on hearth 104 and ensure that the rabbles do not interfere with the rotation of hearth 104. Persons skilled in the art will recognize that this adjustment can be achieved through levers or other adjustment mechanisms.

Rabbles 108 and arms 106 can be covered by encasements filled with coolant. A mechanism can be used to circulate coolant through these encasements to reduce damage to rabbles 108 and arms 106 resulting from continued exposure to high temperatures during operation of the apparatus 100. Persons skilled in the art will recognize that this circulation mechanism can include a mechanical pump or other circulatory component. The coolant can be in the form of gas or liquid. Generally, a coolant having a high thermal capacity, low viscosity and which is chemically inert, so as to not cause or promote corrosion of the encasement, arms 106 and rabbles 108, would be preferred. Examples of such coolants are water, air and nitrogen, however, it will be recognized by one skilled in the art that alternative coolants are suitable. In alternative embodiments, a coolant may be circulated internally within the rabbles 108 and arms 106 also.

Input material 103 can consist of dust or sludge containing oxides of iron as well as oxides of impurities such as zinc, lead and cadmium. In alternative embodiments input material 103 can be in the form of larger particles or micro-pellets, which can be continually mixed by rabbles 108 as hearth 104 rotates.

With reference again to FIG. 1A, FIG. 1B and FIG. 2, in operation, the rotation of hearth 104 will tend to cause input material 103 to be turned around and mixed by each rabble 108 throughout the process of movement from chamber inlet 110 towards chamber outlet 112. The material on the hearth 104 will tend to be continuously mixed which can tend to improve heat transfer in the layer of input material 103. An individual skilled in the art will recognize that the level of mixing attained by apparatus 100 can be dependent on number and spacing of rabbles 108 and arms 106, and that more vigorous mixing may result in improvements in heat transfer as the molecules of the input material 103 and reduction gases make additional contact with one another.

There may be exhaust pipes (not shown in FIG. 1A, FIG. 1B and FIG. 2) connected to the chamber which allow exhaust gases to leave the chamber post reduction reaction. The exhaust gas may be treated before release into the atmosphere, and through such exhaust pipes there may be a device such as a pressure regulator used to maintain internal pressure of combustion chamber 102 at a sub-atmospheric range to prevent toxic gases, such as may be produced from the reduction and combustion processes, such as carbon monoxide, from escaping into the external environment. Persons skilled in the art will recognize that such a device can consist of fans, valves, pistons or other devices used to control and maintain and/or regulate desired pressure within a chamber.

Greater efficiencies may tend be obtained by having longer reaction times and area for a reduction gas to traverse over iron oxide materials on a hearth, and such may be obtained by using multiple combustion chambers arranged in series. With reference to FIG. 3A-3D, multi-chamber furnace 300 for producing direct reduced iron is shown. Apparatus 300 has three combustion chambers 302 arranged vertically. Chambers 302 are similar to chamber 102, with modifications thereto for such to be arranged in stacked fashion in furnace 300 as shown, and like internal components from chamber 102 to chamber 302 are labeled with the same reference number to chamber 102. Chambers 302 each has a corresponding rotating hearth 104 acting as a base for the chamber, and funnels, or channels, 306 connecting one combustion chamber 102 to the next. Such a gas transfer channel 306 connection between chambers will tend to be wider than the chamber inlets/outlets 110/112, and would be configured to transfer reduction gases and heat from one chamber to another. As arranged, the chamber outlet 112 of a higher chamber 302 is connected to the chamber inlet 110 of the chamber below, and the rabbles 108 of each chamber 302 may be arranged to direct materials 103 from the inside edge 116 to outside edge 120 of hearth 104, or vice versa, to direct materials from proximate to the inlet 110 to the outlet 112 of each chamber. As shown in FIG. 3, to provide a more direct drop of material 103 from each chamber 302 to the next, each pair of outlet 112 and the inlet 110 below is arranged near the same edge of the hearths 104 in each chamber.

In the embodiment of FIG. 3, each combustion chamber can be held at different operating conditions from another. For example, each chamber can be heated to different temperatures, while the reducing agent may be added at different level(s) or at different quantities. For example, the reducing agent can be added onto the uppermost level of chamber 302 at a point where the oxide is already preheated or onto a chamber level underneath. As shown, exhaust pipes 330 are also provided and attached to the top-most level of chamber 302 to allow exhaust gas to leave furnace 300, for further treatment or otherwise. As noted above, a fan or other pressure regulating device may be provided in associated with pipes 330 to provide for a generally sub-atmospheric pressure inside furnace 300 to prevent toxic gases, such as may be produced from the reduction and combustion processes, such as carbon monoxide, from escaping into the external environment.

Skilled persons will understand that any number of combustion chambers may be used in a multiple combustion chamber system. Feed material is charged on upper hearth 104, and is transported in a notional spiral motion shown as 140 by stationary rabbles 108, as upper hearth 104 rotates. When the material arrives at the relevant edge of upper hearth 104, it drops through the chamber outlet 112 onto middle hearth 104 through its chamber inlet 110, and the process is repeated until the material has travelled across all hearths 104 and through all combustion chambers 302, and the post reaction materials are discharged from the furnace 300 through the chamber outlet 112 of the lowermost chamber 302. In typical applications, there may be two to eight chambers.

In the embodiment shown in FIG. 3 the use of multiple combustion chambers can provide a process that is subdivided into multiple zones, such as with each zone corresponding to a particular combustion chamber 302. In such systems, each zone can be independently controlled and/or measured which can allow for additional means of optimizing the measured process.

In the embodiment shown, individually calibrated burners 114 with injection points for gas containing oxygen are included which can allow for the control of temperature in each chamber independently. In such embodiments each combustion chamber 302 can be separately calibrated to satisfy reaction requirements for different processes, which can be used to separate and filter out waste components at each level of hearths 104. For example, materials with lower evaporation points can be filtered out of the waste materials in earlier combustion chambers by increasing chamber temperature from one combustion chamber to the next, along the material flow path.

In the embodiment shown, a three chamber furnace 300 is depicted. In typical applications, each hearth 104 may have 6 to 10 arms 106 with 8 to 12 rabbles 108 on each arm 106. The upper hearth may tend to operate at an approximate temperature of 1000 degrees Celsius, while the remaining lower hearths operate at temperatures of 1100 degrees Celsius. The reducing agent may be coal, which may be charged together with the iron oxide input through inlet 110 of the top-most chamber 302, and the rotation speed of the hearths 104 may be adjusted such that the each hearth rotates slightly faster than the one below it. Exemplary hearth dimensions may consist of an outer radius of 9 meters and an inner radius of 4 meters. The casing size can tend to be half a meter in thickness.

With reference to FIG. 4, an alternative to a first (or highest) combustion chamber in a multi-chamber furnace apparatus 300 is shown. The top-most chamber 302 in apparatus 300 may be substituted with chamber 402 shown in FIG. 4. With chamber 402, there is shown rotating hearth 404, chamber inlet 410, chamber outlet 412, arm 406 with rabbles 408 attached thereto, and funnel 406 (all of which are similar to hearth 104, chamber inlet 110, chamber outlet 112, arm 106 with rabbles 108 attached thereto, and funnel 306 as shown in FIG. 3A-D). Chamber 402 differs from chamber 102 in that the interior ceiling height of the chamber is increased as compared to chamber 302, to provide a chamber larger in interior volume than the other chambers in the multi-level furnace. Having such a larger first combustion chamber 402 can tend to improve heat transfer to improve the speed at which reduction temperature requirements are met, which in some embodiments can be in excess of 1000 degrees Celsius.

By way of example, in some embodiments, input material 103, in the form of waste material from other processes, often contains volatile matter from the coal that evaporates at lower temperatures than the temperature required for the metallurgic reduction process. This volatile matter can evaporate at the beginning of the reduction process, in some instances as temperatures reach 400 degrees Celsius. By increasing the volume of the first combustion chamber 402, the volatile matter, that tends to escape during the first phase of the process, can be contained in the first combustion chamber 402 for longer periods of time and can be burned by burners 114, for additional chemical energy output.

As shown in FIG. 4, for the shown embodiment, the increased volume of chamber 402 is achieved by having the ceiling height proximate to the chamber inlet 410 increased, while keeping the ceiling height proximate to chamber outlet 412 approximately the same as the ceiling height in other chambers of the furnace. As described above, the input material may tend to evaporate quickly upon entry into the first chamber of the furnace, and so having increased volume near the chamber inlet tends to be more effective. However, it will be appreciated that in other embodiments other geometries of a first combustion chamber may be utilized.

In the embodiments shown, additional combustion air or other gas containing oxygen, may be injected through burners 114 or through injection ports adjacent to the burners, in order to burn the process gas from the evaporation materials. The energy produced by the combustion of this volatile matter, which in some embodiments is high in calorific value, can be used to increase the temperature in the chamber at a faster rate. In addition, the energy generated from the combustion of the volatile matter, can be used to reduce the additional energy sources required to reach reduction temperature requirements.

Figure 3A:
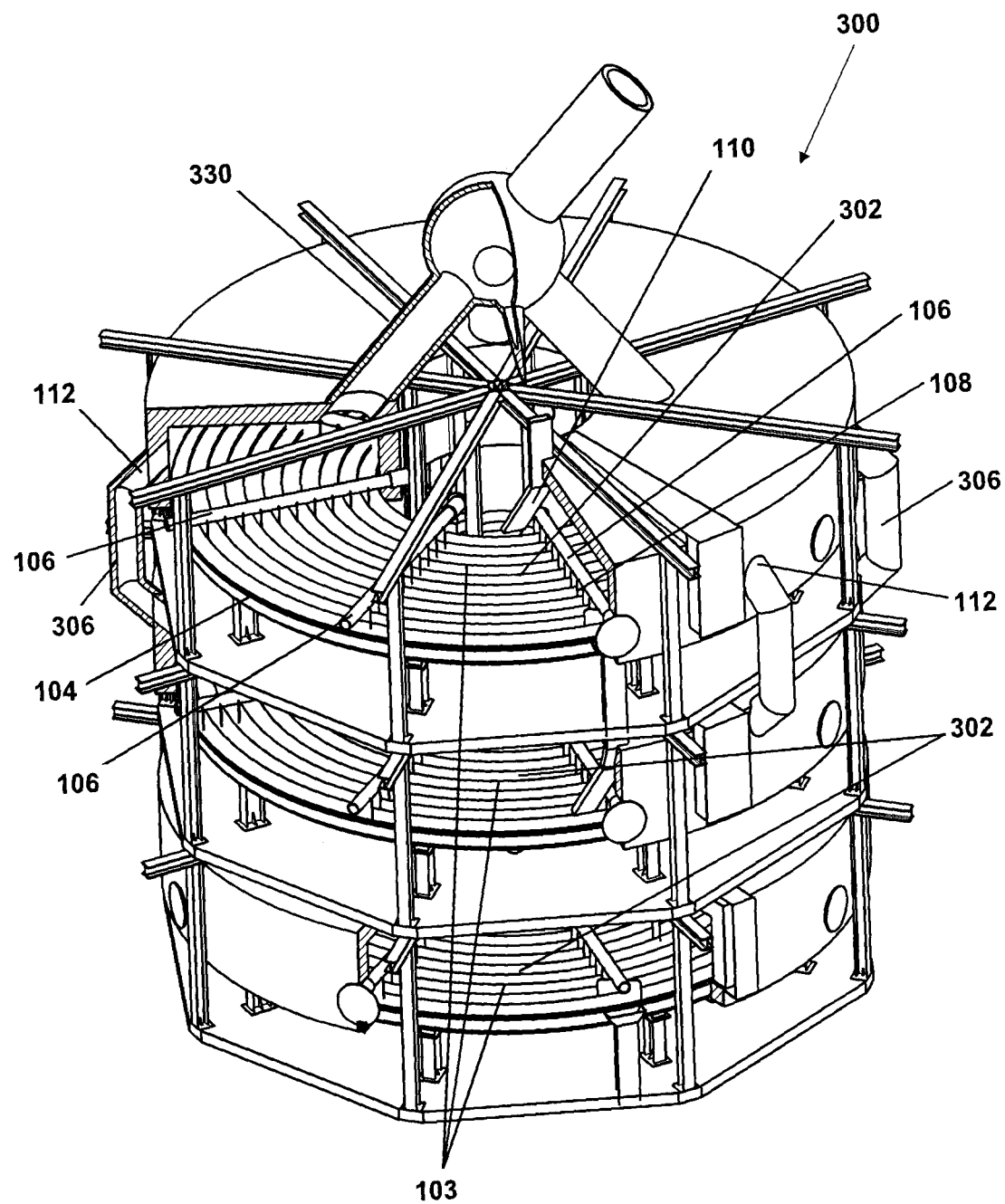
FIG. 3A is a perspective view of an embodiment of a multi-chamber furnace having multiple combustion chambers, with section cut-outs to show interior components of the furnace.
Figure 3B:
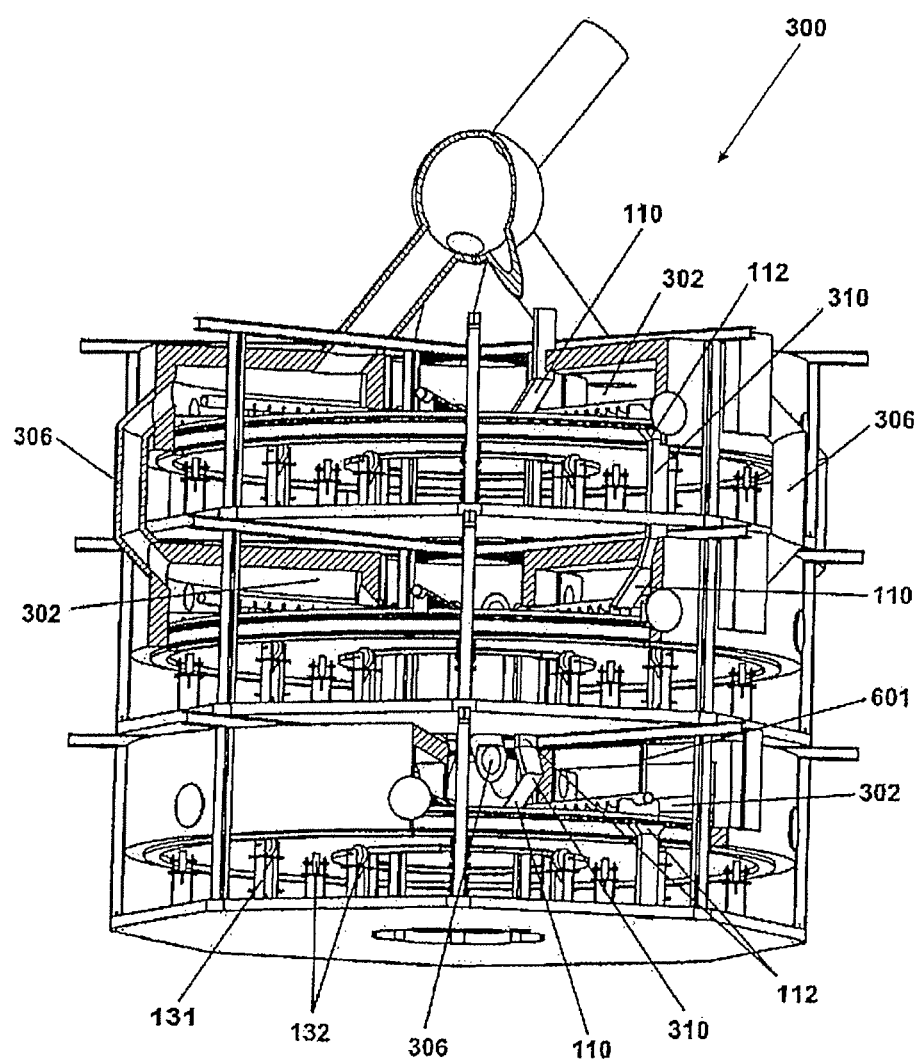
FIG. 3B is an alternate perspective view of the multi-chamber furnace of FIG. 3A, with section cut-outs to show interior components of the furnace.
Figure 3C:
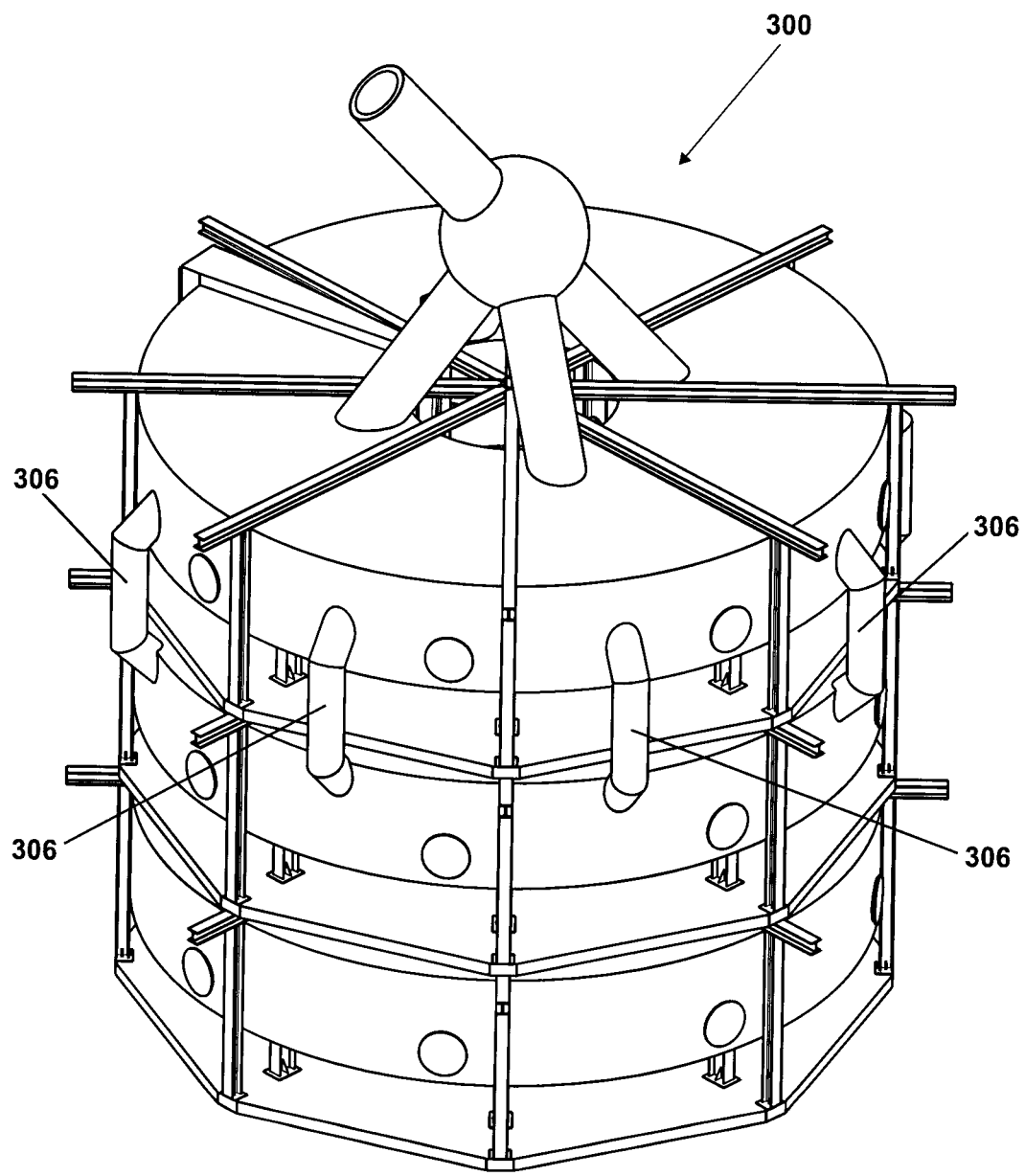
FIG. 3C is a further alternate perspective view of the multi-chamber furnace of FIG. 3A.
Figure 3D:
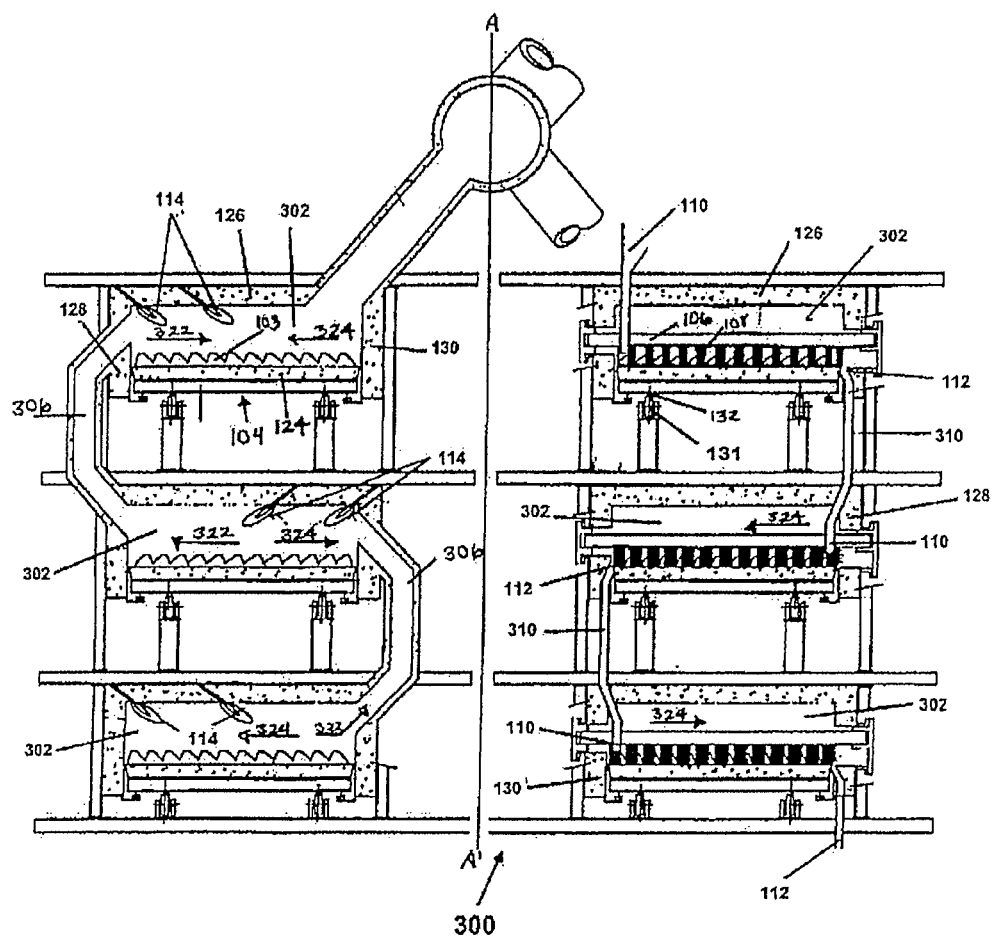
FIG. 3D is a cross sectional view of the multi-chamber furnace of FIG. 3A.

Referring to FIG. 3D, in furnace 300 the flow of material 103 travels counter current to the flow of the reducing gas, which tends to flow from the lower chamber to higher chambers of the furnace through funnels 306 in an opposing direction. In the annular chambers 302 of the embodiment and its arrangement of funnels 306 and inlets/outlets 110/112, direction refers to either from the side of the chamber 302 proximate to inside edge 116 to outside edge 120 of hearth 104, or vice versa.

In the embodiments shown, the reducing agent, typically a heated gas, travels in an upward direction shown with arrows 322, while the iron oxide material feed travels in a downward direction, shown with arrows 324. The counter flow of the two substances can tend to improve molecular contact, and result in an increased reaction time for the reduction process.

In the embodiments of apparatus 300, skilled persons will understand that when the heated gas of the reducing agent has a lower density it will tend to move upward through funnels 306. Material 103, in the embodiment shown being in the form of solid iron oxide, will traverse each chamber 302 and fall from one combustion chamber 302 through to the next chamber 302 (through an outlet 112 to an inlet 110) as a result of gravity. The directional flow of iron oxide material 103 (shown with arrows 324) and the flow of the reducing gas (shown with arrows 322) will tend to be in the opposite direction by the reduction gas moving up funnel 306, and the input material moving down another funnel 310 (that connects chamber outlet 112 of an upper chamber 302 with chamber inlet 110 of a lower chamber 302).

The funnel, or gas transfer channel, 306 may have a larger cross sectional area than funnel 310. The reducing agent and iron oxide material 103, when in either solid, powder or liquid form, tends to travel through the smaller funnel 310 by the arrangement of hearth 104 and inlet/outlets 110/112. The solid or liquid based iron oxide substance is directed through the smaller funnels 310 by the directional rotation of the hearth 104, as well as gravity. The reducing gas will tend to travel through the larger funnel 306, that will typically be unobstructed by materials 103 as would be the case for funnel 310. Such embodiments tend to produce systems where the iron oxide material flows in one direction while the reduction agent flows in the opposite direction through furnace 300. Material will tend to flow through inlet/outlets 110/112, whereas reducing agents will tend to flow through funnel 306.

In certain embodiments, dampers (not shown) may also be placed on and/or near the funnels 306, which can be configured to direct the reducing gas in flow direction 322. During operation, the flow of materials from one chamber to the next (i.e., from the chamber outlet 112 of one chamber, to the chamber inlet 110 of the next chamber below) will tend to be fairly constant, and with the larger funnels 306 unobstructed by materials flowing in the opposite direction, the gases will tend to flow upwards through the funnels 306. In some embodiments, this flow can be further enhanced by the use of gates (not shown) that may be placed near chamber inlets 110, which tend to prevent gaseous reducing agents from entering funnel 310, and which can tend to improve the counter gaseous flow in the direction of 322. Persons skilled in the art will appreciate that such gates, can include, for example, spring weighted gates or doors that are opened by the heavier material oxide but not engaged by the lighter reduction gases. As shown in FIG. 3 A-D funnels 306 and 310 are arranged proximate the outer circumference walls between the top two levels of chambers 302, while proximate to the inner circumference walls between the lower two levels of chambers 302. In embodiments with more levels of chambers 302, this zig-zagging of funnels 306 and 310 over the inner and outer circumference walls may continue. It will be appreciated that more than one funnel 306 may be provided between the levels of chambers 302, and that other arrangements and positioning of such funnels may be provided in other embodiments. Additionally, the lowest hearth 104 in the lowest chamber 302 may include an extra adjustable rabble (not shown) that can be used to discharge the material at a different location than outlet 112, through a secondary chute. This secondary chute may be used if the normal material discharge were interrupted and material was required to be collected in an emergency or back up hopper.

Figure 5:
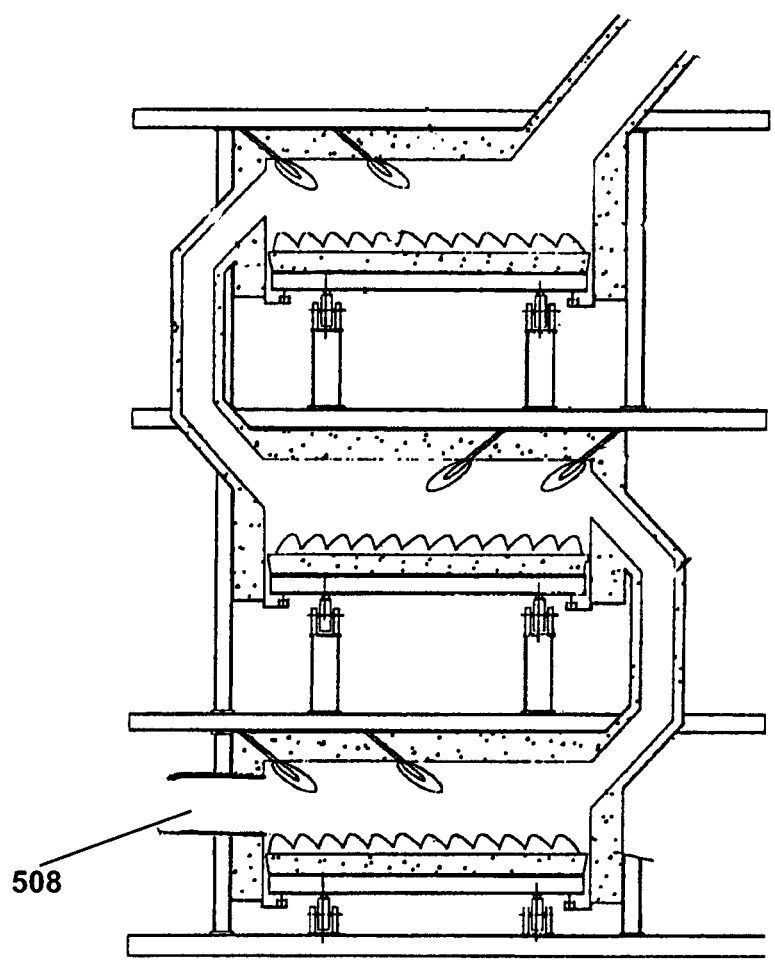
FIG. 5 shows a cross sectional view of an alternate multi-chamber furnace.

FIG. 5 shows apparatus 500, a modified multi-chamber furnace to apparatus 300, in which port 508 is added. As shown in FIG. 5, a further reduction gas may be introduced from gas point 508 at a lower level of the furnace, such gas rising to the upper levels of the system through the funnels. In certain embodiments, the reduction gas may be force injected and pushed into the chamber through port 508. In such embodiments, port 508 may be connected to a melting furnace that provides excess reducing gas to furnace 500.

As shown in FIG. 5, the heated reduction gas which enters from port 508 at a lower level of the system, is transferred to the levels above through a series of funnels. In some embodiments the gas from the lower levels, not exhausted in the reducing reaction, can be combusted at higher levels by burners and corresponding air injection points, which can tend to generate additional heat tending to make the overall process more energy efficient. By way of example, in certain embodiments, only some of the carbon monoxide in the furnace is required for the metallurgical reduction process, and the remaining carbon dioxide is burned to regulate the temperature at the required level.

The hearth furnaces and combustion chambers disclosed herein may optionally include a cleaning device for the hearth. Referring for example to FIG. 1A, FIG. 3B and FIG. 6A-C, apparatus 600 with cleaning device 601 is shown operating with a combustion chamber. The chamber is similar to chambers 102 and 302 described above, and modified as shown in FIG. 6A-C. Certain elements, such as arms 106 and rabbles 108, are not shown in FIG. 6A-C for clarity, but a person of skill would appreciate, with reference to FIGS. 1A and 3B, that cleaning device 601 may be used with chambers 102 and 302, that such chambers may be modified to accommodate the different features of device 601, and that device 601 may be used in other rotary hearth furnaces also.

Device 601 has projection 602 extending from the top of the combustion chamber 102 toward the surface of rotating hearth 104. Device 601 further includes guiding device 604 to move projection 602 in increments along the surface of hearth 104 from between its inside edge 116 and outside edge 120. In the embodiment shown, guiding device 604 is moved across the width of the hearth surface by an electro-mechanic, pneumatic or hydraulic drive, however, persons skilled in the art will appreciate that other drive mechanisms may be suitable for use. In the embodiments shown, guiding device 604 travels on rails 610 installed above the roof of combustion chamber 102.

In operation of an exemplary embodiment, prior to charging hearth 104 with input materials, a layer of inert material 642 is formed on the surface of hearth 104. In certain embodiments, the space between rotating hearth 104 and projection 602 may be filled with such a layer of inert material 642 to reduce the amount of build up of chemicals from the reduction process in the furnace. Inert material can be a granular inert material, such as dolomite, and can first be charged onto hearth 104 and can fill the gap underneath rabbles 108 to the surface of hearth 104.

In some embodiments, prior to charging hearth 104 with input material, hearth 104 can be rotated while device 601 moves in increments along the surface of hearth 104 between its inside edge 116 and outside edge 120 delivering a layer of inert material 642 stored in dispensing device 606 through chute 620. In other embodiments, a layer of inert material 642 can be added manually or through an alternative automated mechanisms. In an exemplary embodiment, the layer of inert material 642 can be one inch in thickness; however, skilled persons will appreciate that the layer of inert material 642 can be of alternative thicknesses.

Once hearth 104 is in operation, as input materials are added into apparatus 600 and moved about via rabbles (not shown in FIG. 6) operating with hearth 104, the input materials can tend to interact with the layer of inert material 642 to replace a portion of the layer of inert material 642 with a dead layer 640 of materials, such dead layer 640 being a layer of input material forming over top of and partially replacing the layer of inert material 642, at least a portion of which is not coming into contact with rabbles 108. In some embodiments, dead layer 640 can replace 25% of the layer of inert material 642 during normal operation; however, skilled persons will appreciate that in other embodiments dead layer 640 can replace a greater or lesser amount of the layer of inert material 642, in some such embodiments being dependant on the inert material used and configuration of the hearth and rabbles.

Dead layer 640 tends to consist of input material that can begin to harden over time. As apparatus 600 continues to operate, dead layer 640 can tend to increase in thickness and can eventually begin to contact rabbles 108. As dead layer 640 contacts rabbles 108, this can tend to increase friction and result in an increase in the power required to rotate hearth 104. In some embodiments, apparatus 600 can provide a user with an alert to inform the user that a cleaning cycle may be required; however, in other embodiments, the user can monitor gauges and other feedback data from apparatus 600 to determine that a cleaning cycle may be required.

To avoid build up of dead layer 640 that may interfere with the operation of the fixed rabbles, device 601 may be continuously active in positioning projection 602 to clean, scrape and/or remove dead layer 640. It will be appreciated that a single device 601 may be able to clean the entire surface of hearth 104, as different cleaning radiuses may be achieved by moving device 601 along rails 610 to position projection 602 at different locations along hearth 104's surface between inside edge 116 and outside edge 120. In alternative embodiments, projection 602 may be operated only periodically and can be moved at other times to a garaged position in area 608 outside of the main heated area of the furnace to minimize heat damage to device 601 (for example, area 608 as shown in FIG. 6C, but which does not appear in the embodiment shown in FIG. 1). In still other embodiments, more than one cleaning device may be employed to increase cleaning speed for a hearth in a combustion chamber.

Upon the initiation of a cleaning cycle, to prevent the cleaning cycle from interfering with the production of direct reduced iron, the introduction of input materials is stopped; however, in other embodiments, the cleaning cycle may operate concurrently with the introduction of input material. In embodiments where the introduction of input materials is stopped, after a predetermined amount of time, device 601 can be moved along track into combustion chamber 102 of hearth 104. In the embodiment shown in FIGS. 6A and 6B, in the operation of the cleaning cycle, hearth 104 is rotated and projection 602 makes contact with dead layer 640 that has replaced the layer of inert material 642, breaking apart dead layer 640 and moving it to expose the remaining layer of inert material 642. Such dead layer 640 that is broken up and moved aside by projection 602 may then be moved off hearth 104 by rabbles 108 as hearth 104 continues to rotate in the cleaning cycle. In some embodiments, projection 602 can be shaped like a shovel, scrapper or plough, to remove residue and push it aside during the rotation of hearth 104. One skilled in the art will recognize that other solid projections can be used to remove material build up and facilitate cleaning, for example in the embodiment shown in FIG. 6C pin 650 is used to remove material build up. Skilled persons will appreciate that in some embodiments projection 602 can remove all or a portion of dead layer 640, and a portion of the layer of inert material 642, and creating a groove.

In some embodiments, projection 602 and other parts of system 600 may be cooled by having a coolant. A mechanism can be used to circulate coolant through projection 602 and other parts to reduce damage to resulting from continued exposure to high temperatures during operation of apparatus 600. Persons skilled in the art will recognize that this circulation mechanism can include a mechanical pump or other circulatory component. The coolant can be in the form of gas or liquid. Generally, a coolant having a high thermal capacity, low viscosity and which is chemically inert, so as to not cause or promote corrosion of projection 602 or other parts of apparatus 600, may be used. Examples of such coolants are water, air and nitrogen, however, it will be recognized by one skilled in the art that alternative coolants are suitable. In alternative embodiments, a coolant may be circulated also.

Figure 6B:
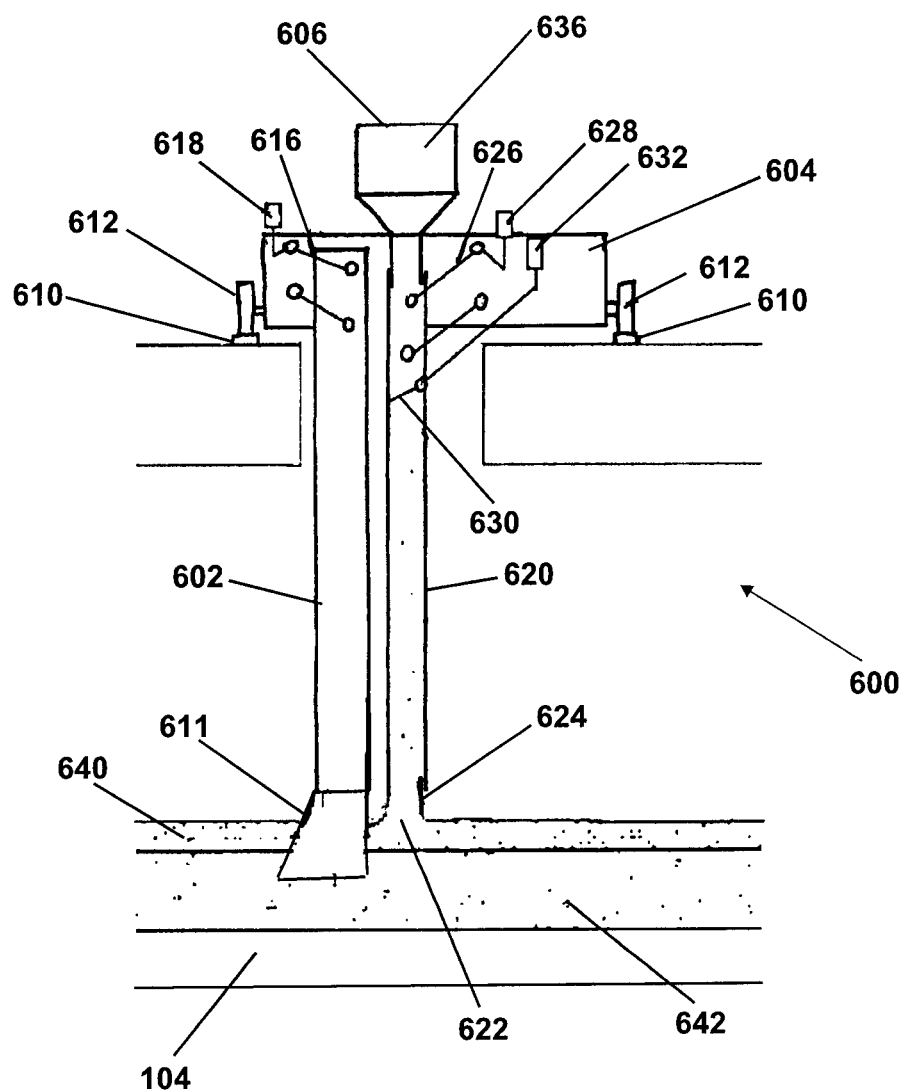
FIG. 6B shows a side view of the cleaning apparatus of FIG. 6A.
Figure 6C:
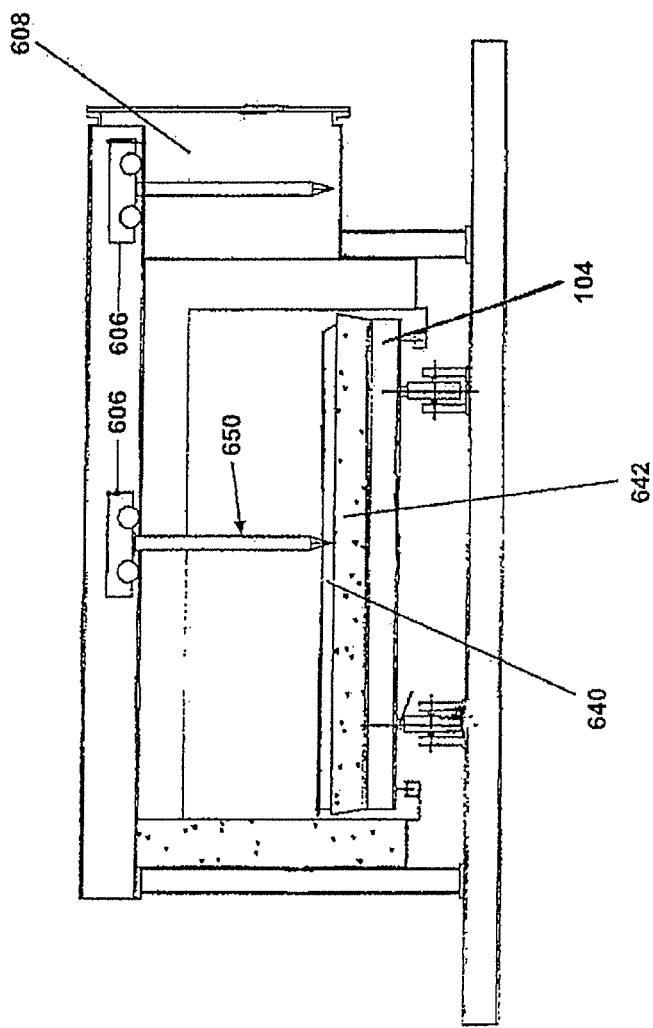
FIG. 6C shows a front view of an alternate cleaning apparatus to the apparatus of FIG. 6A.

FIG. 6A-6C also show a dispensing device 606 that discharges new inert material onto the groove formed as projection 602 removes dead layer 640, and in some embodiments a portion of the layer of inert material 642. Persons skilled in the art will recognize that dispensing device 606 can take the form of a hopper containing granular inert material or any other mechanism capable of reapplying inert material above the surface of hearth 104, such as in the grooves created by projection 602.

The portion of dead layer 642, and in some embodiments a portion of the layer of inert material 640, that has been scraped by projection 602 can be transported by hearth 104 in a spiral fashion as hearth 104 rotates to move materials 103 across the surface of hearth 104 towards chamber outlet 112 where it can exit chamber 102.

It will be understood by one skilled in the art that cleaning device 601 can be used with alternative and existing rotary hearth and multiple hearth direct reduction technology outside the scope of the systems described herein.

With reference to FIG. 6B, a side view of device 601 is shown. In the embodiment, guiding device 604 has wheels 612. Guiding device 604 supports and moves projection 602. Attached to the lower end of projection 602 are breaker/plough 611. Projection 602 is attached to guiding device 604 by mechanism 616 that tends to allow raising and lowering of projection 602 and breaker/plough 611. In the embodiment, the up and down movement may be accomplished with an electromechanic actuator 618. Alternatively, in other embodiments, the actuator can be hydraulically or pneumatically driven. Dispensing device 606 as shown includes chute 620 that distributes new inert material 622 onto the groove formed as projection 602 removes dead layer 640, and in some embodiments a portion of the layer of inert material 642. The lower back edge of chute 620 may also be equipped with scraper 624. Scraper 624 tends to level inert material 622 that is deposited from chute 620 onto the groove formed as projection 602 removes dead layer 640, and in some embodiments a portion of the layer of inert material 642. Chute 620 may be supported by mechanism 626 that can adjust the level of chute 620. The height adjustment can be accomplished with an electromechanic or hydraulic or pneumatic actuator 628. In chute 620 as shown, a gate 630 may be provided that retains the inert material until chute 620 is in a desired position to release inert material 622. Gate 630 may be operated to open and close by mechanism 632 that can be, for example, electromechanically, hydraulically or pneumatically actuated. At the upper end of chute 620 hopper 636 is connected containing the inert material to be applied to hearth 104.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

The invention claimed is:

1. A hearth furnace for producing direct reduced iron, comprising:
    a first combustion chamber;
    a first rotating hearth within the first chamber configured to receive onto its surface iron oxide materials from a first chamber inlet disposed over the first rotating hearth;
    a first set of rabbles disposed over the first rotating hearth to interact with the iron oxide materials, the first set of rabbles configured to push the iron oxide materials on the surface of the first rotating hearth towards a first chamber outlet located towards one of an inside edge of the first rotating hearth or an outside edge of the first rotating hearth as the hearth and the first set of rabbles move relative to one another, the first set of rabbles being configured to interact with the iron oxide materials over an entirety of the surface of the rotating hearth between the inside and outside edge of the first rotating hearth;
    a second combustion chamber;
    a second rotating hearth within the second chamber, the second chamber having a second chamber inlet connected to the first chamber outlet of the first combustion chamber and configured to receive materials pushed to the first chamber outlet and direct the materials onto the second rotating hearth of the second combustion chamber;
    a second set of rabbles disposed over the second rotating hearth of the second combustion chamber, the second set of rabbles configured to push the materials received from the first combustion chamber onto a surface of the second rotating hearth towards a second chamber outlet of the second combustion chamber located towards one of an inside edge or an outside edge of the second rotating hearth of the second combustion chamber as the second hearth and the second set of rabbles moves relative to one another, the second set of rabbles being configured to interact with the received materials over the entirety of the surface of the second rotating hearth of the second combustion chamber between its inside and outside edges; and
    one or more gas transfer channels connecting the first and second combustion chambers, the gas transfer channel being wider than the chamber inlet of the second combustion chamber and configured to transfer reduction gases and heat from a reduction reaction of the received material in the second combustion chamber to the first combustion chamber,
    wherein the first combustion chamber is positioned adjacent to the first rotating hearth, and the second combustion chamber is positioned adjacent to the second rotating hearth;
    wherein the interior volume of the first combustion chamber is larger than an interior volume defined by the second combustion chamber;
    wherein the first chamber inlet is proximate to the inside edge of the first rotating hearth, the first chamber outlet is proximate to the outside edge of the first rotating hearth, the second chamber inlet is proximate to the outside edge of the second rotating hearth, and the second chamber outlet is proximate to the inside edge of the second rotating hearth; and
    wherein the one or more gas transfer channels are disposed proximate to the outside edges of the first and second rotating hearths.

2. The hearth furnace of claim 1, wherein first combustion chamber is taller proximate to the first chamber inlet than proximate to the first chamber outlet.

3. The hearth furnace of claim 2, wherein each of the first and second combustion chambers have multiple burners for controlling a temperature inside each combustion chamber.

4. The hearth furnace of claim 3, wherein the first combustion chamber is maintained at a different temperature than the second combustion chamber.

5. The hearth furnace of claim 4, wherein the first rotating hearth further receives onto its surface a reducing agent, and the first set of rabbles are configured to mix the reducing agent with the iron oxide materials as the first rotating hearth and first set of rabbles move relative to one another.

6. The hearth furnace of claim 5, wherein the rotating hearth of the second combustion chamber further receives onto its surface a further reducing agent, and the second set of rabbles are configured to mix the further reducing agent with the materials received from the first combustion chamber as the second rotating hearth and the second set of rabbles move relative to one another.

7. The hearth furnace of claim 6, wherein:
    the first set of rabbles are attached to one or more stationary arms over the first rotating hearth, and the rotation of the first hearth causes the first rotating hearth and rabbles to move relative to one another; and the rabbles of the second combustion chamber are attached to one or more stationary arms over the rotating hearth of the second combustion chamber, and the rotation of the rotating hearth of the second combustion chamber cause the hearth and rabbles of such chamber to move relative to one another.

8. The hearth furnace of claim 7, wherein the stationary arms of the first and second combustion chambers each having a cooling fluid circulating therethrough.

9. The hearth furnace of claim 1, further comprising:
a solid projection extendible toward the surface of at least one of the first and second rotating hearths, the solid projection adjustable for placement of the projection tip onto a layer of material formed on a surface between the inside edge and the outside edge of the at least one of the first and second rotating hearths to break the layer of material and expose a groove as the rotating hearth rotates; and
a discharge chute configured to deposit an inert material onto the exposed groove.

10. The hearth furnace of claim 9, further comprising a hopper to receive the inert material, the hopper connected to the discharge chute for delivery of the inert material to the discharge chute.

11. The hearth furnace of claim 10, wherein the delivery of inert material from the hopper to the discharged chute is controlled by a valve.

12. The hearth furnace of claim 10, wherein the solid projection has a cooling fluid circulating therethrough.

13. The hearth furnace of claim 10, further comprising a garage area for receiving the solid projection when the solid projection is not in use.

* * * * *